United States Patent Office 2,936,856
Patented May 17, 1960

2,936,856

2-ETHYLHEXYL 6-(2-ETHYLHEXOXY) HEXANOATE

John B. Braunwarth, Crystal Lake, and Gifford W. Crosby, River Forest, Ill., assignors to The Pure Oil Company, Chicago, Ill., a corporation of Ohio No Drawing. Application February 1, 1957
Serial No. 637,626

2 Claims. (Cl. 184—1)

This invention relates to novel alkoxy esters and to their method of preparation. More particularly, the invention is directed to alkoxy esters having properties which make them useful as lubricants.

We have discovered that alkoxy esters corresponding to the formula $$R_1\text{—O—}R_2\text{—COOR}_3$$

where $R_1$ and $R_3$ may be alkyl, cycloalkyl, cycloalkyl alkyl, arylalkyl, or alkenyl groups containing 6–20 carbon atoms, and in which $R_1$ and $R_3$ may be the same or different, and $R_2$ is a divalent hydrocarbon radical consisting of a polymethylene chain containing 4–12 carbon atoms, inclusive, with 0–3 alkyl side chains, each of which contains 1–9 carbon atoms, have properties which make them suitable as synthetic lubricants. Compounds corresponding to the aforesaid formula are viscous liquids with high thermal stability, have high boiling points (in excess of 350° C.), low pour points and high viscosity indexes, all of which properties make them superior as lubricants. $R_1$ and $R_3$ in the aforesaid formula may be any of the following groups or radicals; n-hexyl, n-dodecyl, 2-octyl, 2-ethylhexyl, trimethylheptyl, tetramethylnonyl, 4-methyl-2-pentyl, cyclohexyl, 4-cyclohexyl butyl, 3-phenylpropyl, oleyl. $R_1$ and $R_3$ may be the same or different radicals.

$R_2$ in the above formula may be any of the following radicals: pentamethylene, hexamethylene, 3-ethylpentamethylene, 1-heptylnonamethylene, 1,4-diethylpentamethylene, 2-ethyl-4-methylpentamethylene. The radicals in group $R_2$ may be used in conjunction with any of the radicals under group $R_1$ and $R_3$. Specific examples of compounds falling within the scope of the invention are 2-ethylhexyl 6-(2-ethylhexoxy) hexanoate, 2-ethylhexyl 7-(2-ethylhexoxy) heptanoate and decyl 6-decoxyhexanoate.

The novel alkoxy esters of our invention may be prepared from an omega-halogen-substituted acid or ester of a low-boiling alcohol such as methyl or ethyl by esterifying the acid with the desired alcohol or by exchanging the methyl or ethyl radical with a higher alcohol radical and then reacting the ester with an alkali metal alcoholate to form the desired alkoxy ester. The following example will illustrate the general method of preparing alkoxy esters in accordance with our invention.

Example 2-ethylhexyl 6-(2-ethylhexoxy) hexanoate is prepared by mixing 36.7 grams (0.185 mol) of methyl 6-bromohexanoate, 120 cc. of 2-ethylhexanol, 50 cc. of toluene and 5 gm. of p-toluene sulfonic acid (catalyst) and heating the mixture under reflux for 20 hours. The mixture is then cooled and washed with 75 cc. of 6% potassium hydroxide solution, followed by water washing until neutral. The 2-ethylhexyl ester of 6-bromohexanoic acid formed in the reaction is separated and dried over calcium sulfate, then filtered and distilled to remove toluene and excess 2-ethylhexanol.

A solution of sodium 2-ethylhexoxide is prepared by gently heating and stirring 6 gm. (0.26 mol) of metallic sodium in 93.2 gm. of 2-ethylhexanol. To this solution is added 2-ethylhexyl 6-bromohexanoate, while stirring at 100° C., and the stirring is continued for 5 hours. The reaction mixture is then cooled and 100 cc. of benzene added, followed by a solution of 10 cc. of concentrated hydrochloric acid in 250 cc. of distilled water. An aqueous and an organic phase are formed. The organic phase is washed with water and dried over calcium sulfate, filtered and distilled to remove benzene and excess 2-ethylhexanol. The residue is then distilled in a 6" Vigreaux column under a vacuum of 0.04 mm. of mercury and the vapor which is given off at 129–135° C. is cooled as the desired product. The R.I. of the product at 20° C. is 1.4464 and it has a molecular weight of 370 as compared to the theoretical molecular weight for the compound of 356. It has a SUS viscosity at 100° F. of 53 and at 210° F. of 34.1. The pour point is below −75° F. and the viscosity index is 112.

The formula of the compound prepared in accordance with the foregoing example is

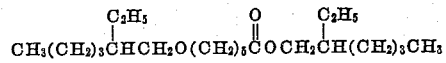

Although the procedure just outlined is applicable to the preparation of other compounds falling within the scope of the invention, it will be apparent that the specific amounts of reagents required to react with each other will differ, depending on their molecular weights. It will be also apparent that the temperature at which the final product is collected will be determined by the boiling point of the product.

Although in the specific example the methyl ester of 6-bromohexanoic acid was used in the starting material, 6-bromohexanoic acid may be used equally well. The procedure will otherwise be the same.

The omega-halogen-substituted acid or ester used as the starting material in the preparation of our novel alkoxy esters may be prepared in accordance with the method disclosed in our co-pending application, Serial No. 630,090. Briefly, the method involves the reaction of a suitable cyclohydroperoxide with bromotrichloromethane in a reaction medium consisting of acidified aqueous methanol containing ferrous sulfate. For example, in the preparation of omega-bromocaproic acid, cyclohexanol hydroperoxide is reacted with bromotrichloromethane. In order to readily separate the omega-bromocaproic acid from the mixture, the mixture is filtered and then esterified with methyl alcohol in the presence of p-toluene sulfonic acid as a catalyst.

The compounds of our invention are suitable for lubricating engine parts where the engine parts reach high operating temperatures, as in the case of turbines. These compounds are eminently suitable for use under low temperature conditions because of their low pour points. Their high V.I.'s make them suitable for use in lubricating moving parts under a wide range of temperature conditions.

We claim as our invention:

1. 2-ethylhexyl 6-(2-ethylhexoxy) hexanoate.
2. A method for lubricating equipment having moving mechanical parts with surfaces in frictional contact, said method comprising applying to said surfaces a lubricant consisting of 2-ethylhexyl 6-(2-ethylhexoxy) hexanoate.

(References on following page)

References Cited in the file of this patent

UNITED STATES PATENTS

| | | |
|---|---|---|
| 1,759,331 | Van Schaack | May 20, 1930 |
| 2,109,947 | North | Mar. 1, 1938 |
| 2,366,276 | McNamee | Jan. 2, 1945 |
| 2,464,740 | Adelson | Mar. 15, 1949 |
| 2,490,109 | Weizmann | Dec. 6, 1949 |
| 2,870,195 | Heininger et al. | Jan. 20, 1959 |

OTHER REFERENCES

Bennett et al.: Chem. Abst., 21 (1927), 1639(2).
Hunsdiecker et al.: Chem. Abst., 37 (1943), 3405(1).
Rehberg et al.: J. Am. Chem. Soc. 68 (1946), 544–6.
Rehberg et al.: J. Am. Chem. Soc. 69 (1947), 2966–70.
Moreton: Lubrication Engineering 10, 65–73 (1954).
Reppe et al.: Ann-Chem., Justus Liebigs, 596, 193–194 (1955).